(12) United States Patent
Yan et al.

(10) Patent No.: US 10,148,191 B2
(45) Date of Patent: Dec. 4, 2018

(54) BI-DIRECTIONAL ISOLATED POWER CONVERSION DEVICE AND POWER CONVERTING METHOD

(71) Applicant: DELTA ELECTRONICS, INC., Taoyuan (TW)

(72) Inventors: Chao Yan, Taoyuan (TW); Li-Ping Sun, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 23 days.

(21) Appl. No.: 15/688,850

(22) Filed: Aug. 28, 2017

(65) Prior Publication Data
US 2018/0152115 A1    May 31, 2018

(30) Foreign Application Priority Data
Nov. 25, 2016  (CN) .......................... 2016 1 1056616

(51) Int. Cl.
| | | |
|---|---|---|
| H02M 3/156 | (2006.01) | |
| H02M 3/158 | (2006.01) | |
| H02M 7/00 | (2006.01) | |
| H02M 3/335 | (2006.01) | |
| H02M 7/02 | (2006.01) | |
| H02M 7/42 | (2006.01) | |
| H02M 7/797 | (2006.01) | |
| H02M 1/00 | (2006.01) | |

(52) U.S. Cl.
CPC .......... *H02M 7/003* (2013.01); *H02M 3/156* (2013.01); *H02M 3/158* (2013.01); *H02M 3/1588* (2013.01); *H02M 3/33584* (2013.01); *H02M 7/02* (2013.01); *H02M 7/42* (2013.01); *H02M 7/797* (2013.01); *H02M 3/1582* (2013.01); *H02M 3/33592* (2013.01); *H02M 2001/007* (2013.01); *H02M 2001/0067* (2013.01)

(58) Field of Classification Search
CPC ........... H02M 2001/007; H02M 7/757; H02M 3/33584; H02M 3/1584
See application file for complete search history.

(56) References Cited

U.S. PATENT DOCUMENTS

| | | | | |
|---|---|---|---|---|
| 2015/0180350 A1* | 6/2015 | Huang | .................. | H02J 7/0068 307/66 |
| 2015/0195878 A1* | 7/2015 | Garrity | .............. | H05B 33/0815 315/186 |

(Continued)

FOREIGN PATENT DOCUMENTS

| | | |
|---|---|---|
| CN | 102437628 A | 5/2012 |
| CN | 102709994 A | 10/2012 |

*Primary Examiner* — Timothy J Dole
*Assistant Examiner* — Ishrat Jamali
(74) *Attorney, Agent, or Firm* — CKC & Partners Co., Ltd.

(57) ABSTRACT

A power conversion device is disclosed herein. The power conversion device includes an AC/DC converter, a DC/DC converter, and a DC/DC isolation converter. The AC/DC converter is configured to convert AC power into a first DC power, or convert the first DC power into the AC power. The DC/DC converter is configured to convert the first DC power into a second DC power, or convert the second DC power into the first power. The DC/DC isolation converter is coupled between the AC/DC converter and the DC/DC converter, and configured to isolate the AC/DC converter and the DC/DC converter bi-directionally.

10 Claims, 5 Drawing Sheets

(56) References Cited

U.S. PATENT DOCUMENTS

2015/0333637 A1* 11/2015 Izumi .................. H02M 1/32
　　　　　　　　　　　　　　　　　　　　　363/21.01
2016/0211749 A1* 7/2016 Okada ................ H02M 7/487

* cited by examiner

120/120A

130/130A

BI-DIRECTIONAL ISOLATED POWER CONVERSION DEVICE AND POWER CONVERTING METHOD

RELATED APPLICATIONS

This application claims priority to China Application Serial Number 201611056616.6, filed Nov. 25, 2016, which is herein incorporated by reference.

BACKGROUND

Field of Invention

The present disclosure relates to a power conversion device and a power converting method. More particularly, the present disclosure relates to a bi-directional isolated power conversion device and power converting method.

Description of Related Art

With the development of new energy fields, including the fields of solar energy, wind power, etc., new energy generation has occupied an increasingly higher share of the overall power generation market. However, the new energy generation is affected by weather conditions, so that the generating capacity has larger fluctuations, which in turn significantly impacts on the power grid. In order to improve on the negative impact of the new energy generation on the power grid, an energy storage device can be used as a buffer device between the new energy generation station and the power grid so as to reduce the impact on the power grid caused by fluctuations of the power outputted by the new energy generation.

In addition, with electrification in the fields of transport, including rail transportation, electric vehicles, and even the future electric propulsion ships and aircraft, all need to energy storage devices, which shows that the future demand for energy storage devices will be increasing. When an energy storage device is used for storing electric energy, it is necessary to charge and discharge the battery in the energy storage device. If the battery needs to be charged and discharged by using a same power conversion in some cases, a reliable bi-directional power conversion is needed to charge and discharge the battery.

However, if in the prior art a bi-directional power conversion uses its converter on the input side to simultaneously perform power conversion and bi-directional isolation, both its weight and volume will be larger and its price will be more expensive. Additionally, if its converter on the output side is used to simultaneously perform power conversion and bi-directional isolation, the design is difficult and the efficiency is low.

For the forgoing reasons, there is a need to solve the above-mentioned problems by providing a power conversion device and a power converting method.

SUMMARY

The foregoing presents a simplified summary of the disclosure in order to provide a basic understanding to the reader. This summary is not an extensive overview of the disclosure and it does not identify key/critical elements of the present disclosure or delineate the scope of the present disclosure. Its sole purpose is to present some concepts disclosed herein in a simplified form as a prelude to the more detailed description that is presented later.

A power conversion device is provided. The power conversion device comprises an AC/DC converter, a DC/DC converter, and a DC/DC isolation converter. The AC/DC converter is configured to convert AC power into a first DC power or convert the first DC power into the AC power. The DC/DC converter is configured to convert the first DC power into a second DC power or convert the second DC power into the first DC power. The DC/DC isolation converter is coupled between the AC/DC converter and the DC/DC converter, and is configured to isolate the AC/DC converter and the DC/DC converter bi-directionally.

The disclosure provides a power converting method applied to a power conversion device. The power conversion device comprises an AC/DC converter, a DC/DC isolation converter, and a DC/DC converter. The DC/DC isolation converter is coupled between the AC/DC converter and the DC/DC converter. The power converting method comprises: using the AC/DC converter to convert AC power into a first DC power, or convert the first DC power into the AC power; using the DC/DC converter to convert the first DC power into a second DC power, or convert the second DC power into the first DC power; and using the DC/DC isolation converter to isolate the AC/DC converter and the DC/DC converter bi-directionally.

Therefore, the embodiments of the present disclosure provide a power conversion device and a power converting method. By using the above device designs and operation method, the power conversion device is allowed to be a bi-directional power conversion device having wide adaptation, and is able to be adapted to a wide range of battery voltage and a wide range of grid voltage and have a high conversion efficiency and safe isolation between an input terminal and an output terminal.

Many of the attendant features will be more readily appreciated as the same becomes better understood by reference to the following detailed description considered in connection with the accompanying drawings.

It is to be understood that both the foregoing general description and the following detailed description are by examples, and are intended to provide further explanation of the disclosure as claimed.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure. In the drawings.

According to the usual mode of operation, various features and elements in the figures have not been drawn to scale, which are drawn to the best way to present specific features and elements related to the disclosure. In addition, among the different figures, the same or similar element symbols refer to similar elements/components.

DESCRIPTION OF THE EMBODIMENTS

To make the contents of the present disclosure more thorough and complete, the following illustrative description is given with regard to the implementation aspects and embodiments of the present disclosure, which is not intended to limit the scope of the present disclosure. The features of the embodiments and the steps of the method and their sequences that constitute and implement the embodiments are described. However, other embodiments may be used to achieve the same or equivalent functions and step sequences.

Unless otherwise defined herein, scientific and technical terminologies employed in the present disclosure shall have the meanings that are commonly understood and used by one of ordinary skill in the art. Unless otherwise required by context, it will be understood that singular terms shall include plural forms of the same and plural terms shall include the singular. Specifically, as used herein and in the claims, the singular forms "a" and "an" include the plural reference unless the context clearly indicates otherwise.

As used herein, "couple" refers to direct physical contact or electrical contact or indirect physical contact or electrical contact between two or more devices. Or it can also refer to reciprocal operations or actions between two or more devices.

Figure 1:
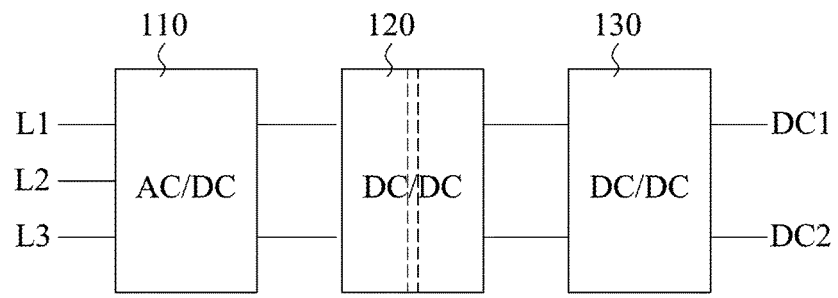
FIG. 1 depicts a schematic diagram of a power conversion device according to one embodiment of this disclosure.

FIG. 1 depicts a schematic diagram of a power conversion device 100 according to one embodiment of this disclosure. As shown in the figure, the power conversion device 100 comprises an AC/DC converter 110, a DC/DC isolation converter 120, and a DC/DC converter 130. As for connection relationships, the DC/DC isolation converter 120 is coupled between the AC/DC converter 110 and the DC/DC converter 130.

As for operations, the AC/DC converter 110 is configured to convert AC power into DC power so as to accomplish non-isolated AC/DC conversion. The DC/DC isolation converter 120 is configured to isolate the AC/DC converter 110 and the DC/DC converter 130 bi-directionally. Here, the DC/DC isolation converter 120 is configured to realize high-frequency isolation between circuits, and basically there is no need to adjust the voltage and only the bi-directional isolation task needs to be completed. Then, the DC power converted by the AC/DC converter 110 is supplied to the DC/DC converter 130, and the DC/DC converter 130 converts DC power having a first voltage into DC power having a second voltage. Here, the DC/DC converter 130 accomplishes a wide range regulation of an output voltage, and at the same time achieves high efficiency conversion at various output voltages.

In addition, the power conversion device 100 can serve as a bi-directional power conversion device so as to charge or discharge an external component, such as a battery in an energy storage device, when necessary. Hence, the DC/DC converter 130 of the power conversion device 100 can further convert the DC power having the second voltage into the DC power having the first voltage. In other words, the DC/DC converter 130 can perform bi-directional conversion. Additionally, the AC/DC converter 110 of the power conversion device 100 can further convert the DC power having the first voltage into AC power. In other words, the AC/DC converter 110 can perform bi-directional conversion.

Therefore, since the power conversion device 100 according to the present disclosure can serve as a bi-directional power conversion device and a converter on its input side (such as the AC/DC converter 110) only needs to accomplish its own conversion task and does not need to be responsible for isolation task additionally, both the weight and volume of the power conversion device 100 can be reduced as compared with the prior art power conversion device and the cost of the power conversion device 100 is lower. In addition to that, since a converter (such as the DC/DC converter 130) on an output side of the power conversion device 100 also only needs to accomplish its own conversion task and does not need to be responsible for isolation task additionally, the design of the power conversion device 100 is simpler and the conversion efficiency of the power conversion device 100 is higher as compared with the prior art power conversion device. Additionally, the power conversion device 100 can further realize high-frequency isolation between circuits by using the DC/DC isolation converter 120. As a result, the power conversion device 100 is allowed to be a bi-directional power conversion device having wide adaptation through the above device design and configuration so as to be adapted to a wide range of battery voltage and a wide range of grid voltage and have a high conversion efficiency and safe isolation between an input terminal and an output terminal of the power conversion device.

Figure 2:
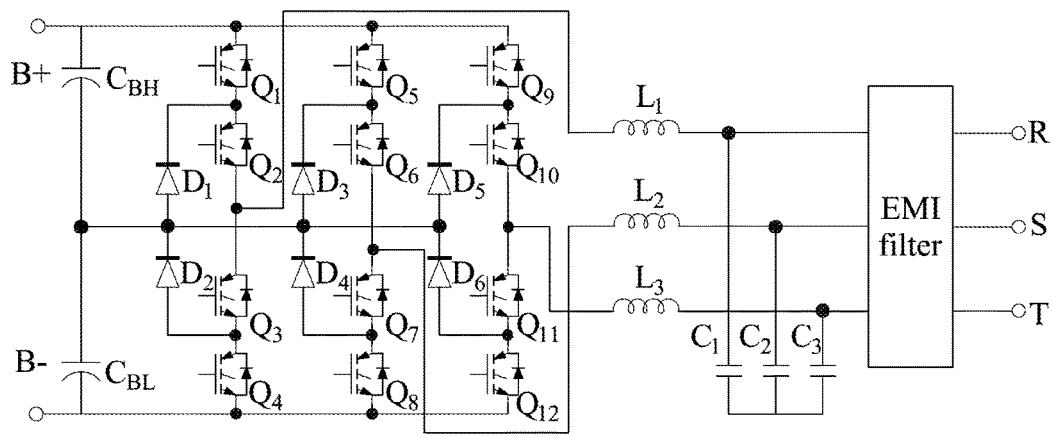
FIG. 2 depicts a schematic diagram of a detailed circuit of the AC/DC converter of the power conversion device in FIG. 1 according to another embodiment of this disclosure.
Figure 3:
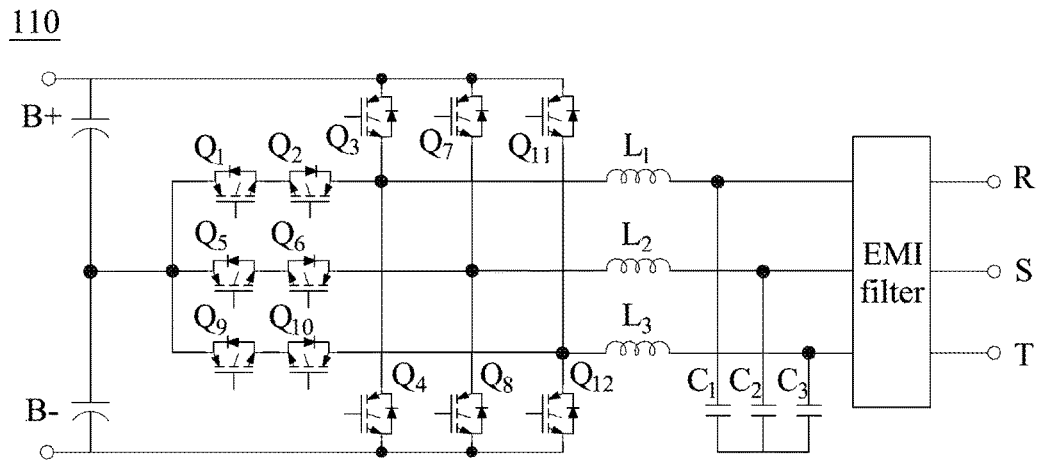
FIG. 3 depicts a schematic diagram of a detailed circuit of the AC/DC converter of the power conversion device in FIG. 1 according to still another embodiment of this disclosure.
Figure 4:
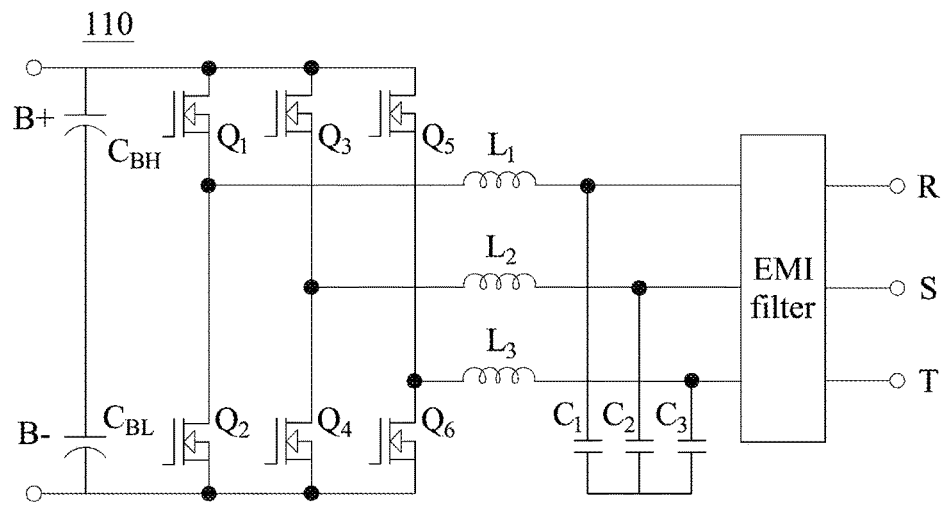
FIG. 4 depicts a schematic diagram of a detailed circuit of the AC/DC converter of the power conversion device in FIG. 1 according to yet another embodiment of this disclosure.

FIG. 2 to FIG. 4 depict schematic diagrams of detailed circuits of the AC/DC converter 110 of the power conversion device 100 in FIG. 1 according to some embodiments of this disclosure. As shown in FIG. 2, the AC/DC converter 110 may be implemented by using a D-type three level inverter/converter. As shown in FIG. 3, the AC/DC converter 110 may be implemented by using a T-type three level inverter/converter. As shown in FIG. 4, the AC/DC converter 110 may be implemented by using a two level inverter/converter. In the above embodiments, the AC/DC converter 110 receives three-phase AC power via input terminals R, S, T of an electromagnetic interference filter (EMI filter) and converts the three-phase AC power into the DC power. The DC power is outputted from a positive DC bus terminal B+ and a negative DC bus terminal B−. However, the present disclosure is not limited to the above embodiments, which are merely illustrative of one of the methods for implementing the present disclosure.

Figure 5:
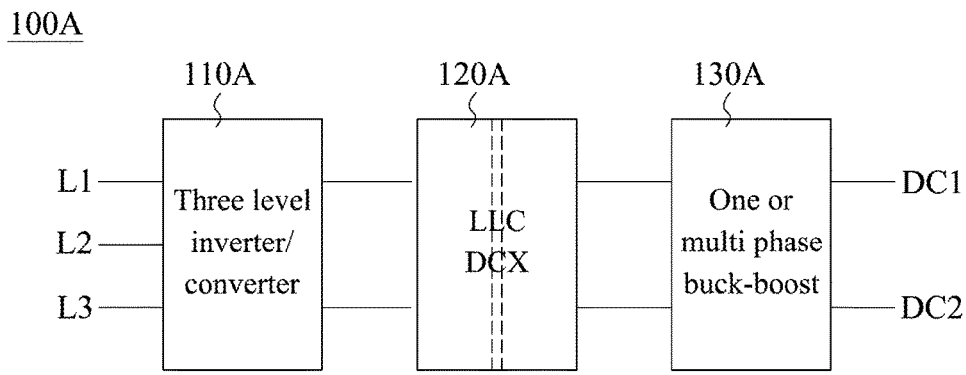
FIG. 5 depicts a schematic diagram of a power conversion device according to one embodiment of this disclosure.

FIG. 5 depicts a schematic diagram of a power conversion device 100A according to one embodiment of this disclosure. As shown in the figure, an AC/DC converter 110A of the power conversion device 100A may be implemented by using a three level converter or a three level inverter. A DC/DC isolation converter 120A may be implemented by using a LLC non-regulating DC/DC isolation converter (DCX). A DC/DC converter 130A may be implemented by using a single or multi-phase buck-boost converter. Since the operation method of the power conversion device 100A shown in FIG. 5 is similar to the operation method of the power conversion device 100 shown in FIG. 1, a description in this regard is not provided to simplify matters.

Figure 6:
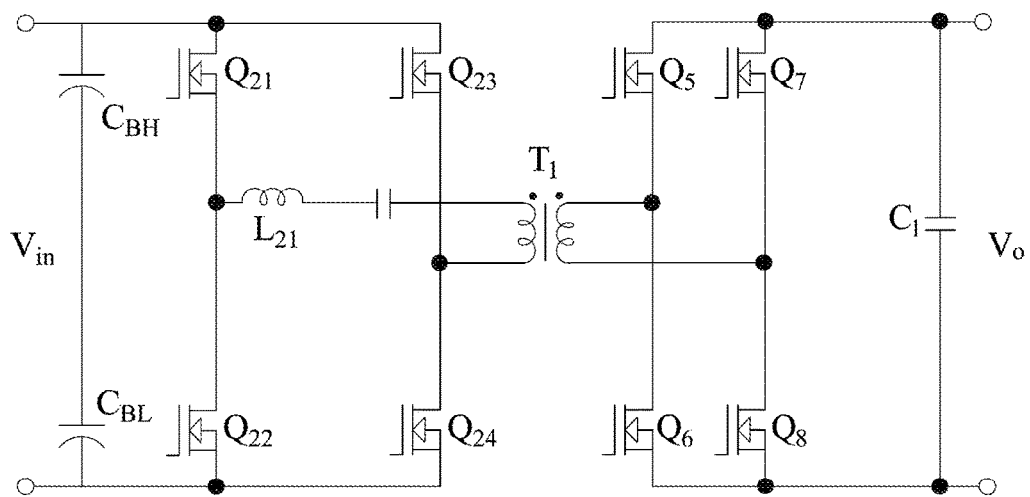
FIG. 6 depicts a schematic diagram of a detailed circuit of the DC/DC isolation converter of the power conversion device shown in FIG. 1 or FIG. 5 according to another embodiment of this disclosure.

FIG. 6 depicts a schematic diagram of a detailed circuit of the DC/DC isolation converter 120/120A of the power conversion device 100/100A shown in FIG. 1 or FIG. 5 according to another embodiment of this disclosure. As shown in the figure, the DC/DC isolation converter 120/120A of the power conversion device 100/100A may be implemented by using a LLC non-regulating DC/DC isolation converter.

Figure 7:
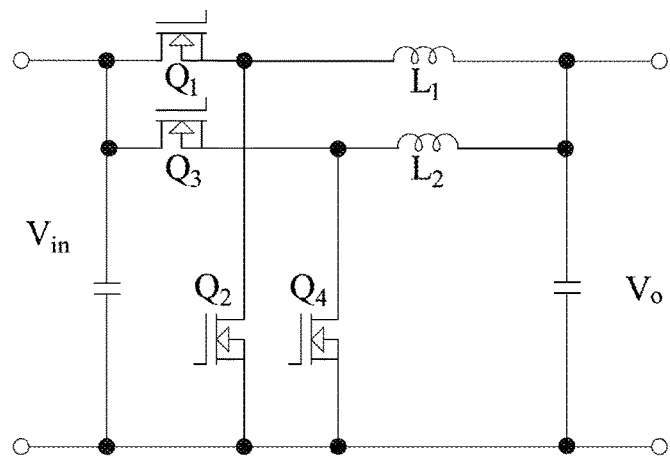
FIG. 7 depicts a schematic diagram of a detailed circuit of the DC/DC converter of the power conversion device shown in FIG. 1 or FIG. 5 according to still another embodiment of this disclosure.

FIG. 7 depicts a schematic diagram of a detailed circuit of the DC/DC converter 130/130A of the power conversion device 100/100A shown in FIG. 1 or FIG. 5 according to still another embodiment of this disclosure. As shown in the figure, the DC/DC converter 130/130A may be implemented by using a multi-phase buck-boost converter.

In one embodiment, if the DC/DC isolation converter 120/120A and the DC/DC converter 130/130A of the power conversion device 100/100A adopt a two-stage serial D2D (DC/DC) scheme, the DC/DC isolation converter 120/120A adopts the LLC non-regulating DC/DC isolation converter (DCX) (open loop control, the operating frequency is kept unchanged, at the same time the operating frequency is basically the same as the theoretical resonant frequency, such as a deviation less than 10%). Or, even a closed loop control is used, the operating frequency is very close to the LLC resonant frequency (for example, fs=fresonant±10%) through setting a specific output voltage reference. The DC/DC converter 130/130A adopts the multi-phase buck-boost converter to regulate the output voltage and optimize the efficiency through the pulse width modulation (PWM) control method.

As compared with the circuit of the present disclosure that adopts a three-stage structure (the AC/DC converter 110, the DC/DC isolation converter 120, and the DC/DC converter 130), the prior art circuit that adopts a two-stage structure has the following problems. It is assumed that a rate of change of an output voltage of a converter H=2 and an input voltage is fixed, then an effective duty cycle of the circuit is 90% and the other 10% of the duty cycle is a commutation time in which the primary current changes direction when the output voltage is set at a maximum value Vmax. Then, when the output voltage is a minimum value Vmin, the effective duty cycle of the circuit is 45%, another 45% of the duty cycle is the freewheeling time of the circuit, and the other 10% of the duty cycle is the commutation time in which the primary current changes direction. The point of this problem is that within the freewheeling time (45% of the duty cycle), a freewheeling path of an inductor current not only needs to pass a synchronous rectification metal-oxide-semiconductor field-effect transistor (MOSFET) on the secondary side, but also needs to pass the primary winding and secondary winding of the transformer. In addition, an equivalent freewheeling current on the primary side flows through the MOSFET on the primary side, and a diode that is connected to the MOSFET in anti-parallel, and a serially-connected inductor on the primary side. Owing to the many elements in the path along which the inductor current freewheels, there is a larger on-state loss. Moreover, it is very obvious that the more the ratio is occupied by the time within which freewheeling occurs, the greater the overall loss is and the lower the efficiency is. Hence, when the output voltage is lower, the effective duty cycle of the circuit is lower (the effective duty cycle of the circuit is basically proportional to the output voltage), so the efficiency is lower.

The circuit according to the present disclosure that adopts a three-stage structure can improve on the above problems, and a description is provided as follows. It is assumed that a rate of change of an output voltage of the present disclosure buck-boost converter H=2 and an input voltage is fixed, then an effective duty cycle of the circuit is 95% and the commutation time within which the primary current changes direction no longer exists in this circuit when the output voltage is set at a maximum value Vmax. When the output voltage is Vmin, the effective duty cycle of the circuit is 47.5%, and the other 52.5% of the duty cycle is freewheeling time in which an inductor current freewheels. For the buck-boost converter, during the process that the inductor current freewheels, the current only flows through a freewheeling MOSFET. As compared with the prior art, the loss caused in the freewheeling process is greatly reduced. Therefore, under the same relatively low output voltage, the efficiency of the buck-boost converter is much higher than that of the phase-shifted full-bridge circuit. Generally speaking, under the circumstances that H=2 and the output voltage Vmin=0.5Vmax, the efficiency of the buck-boost converter will be higher than that of the phase-shifted full-bridge circuit by 2.5% to 3%. In some applications, for example, under the circumstances that H=10 and the output voltage Vmin=0.1Vmax, the efficiency of the buck-boost converter will even be higher than that of the phase-shifted full-bridge circuit by 10%. Of course, for the circuit according to the present disclosure that has the three-stage structure, the efficiency of the DC/DC part is obtained by multiplying the efficiency of the second-stage LLC non-regulating DC/DC isolation converter (DCX) by the efficiency of the third-stage buck-boost converter. Under the circumstances that the final output voltage (that is, an output voltage of the buck-boost converter) is Vmax, 0.5Vmax, or 0.1Vmax, the efficiency of a typical LLC non-regulating DC/DC isolation converter (DCX) is 98.5%, 99%, or 97%. Hence, when the final output voltages are 0.5Vmax and 0.1Vmax, the efficiencies of the three-stage scheme will be respectively higher than those of the two-stage scheme by 1.5% and 7%, and the lower the final output voltage is, the more obvious the efficiency advantage of the three-stage structure is as compared with the two-stage structure.

Figure 8:
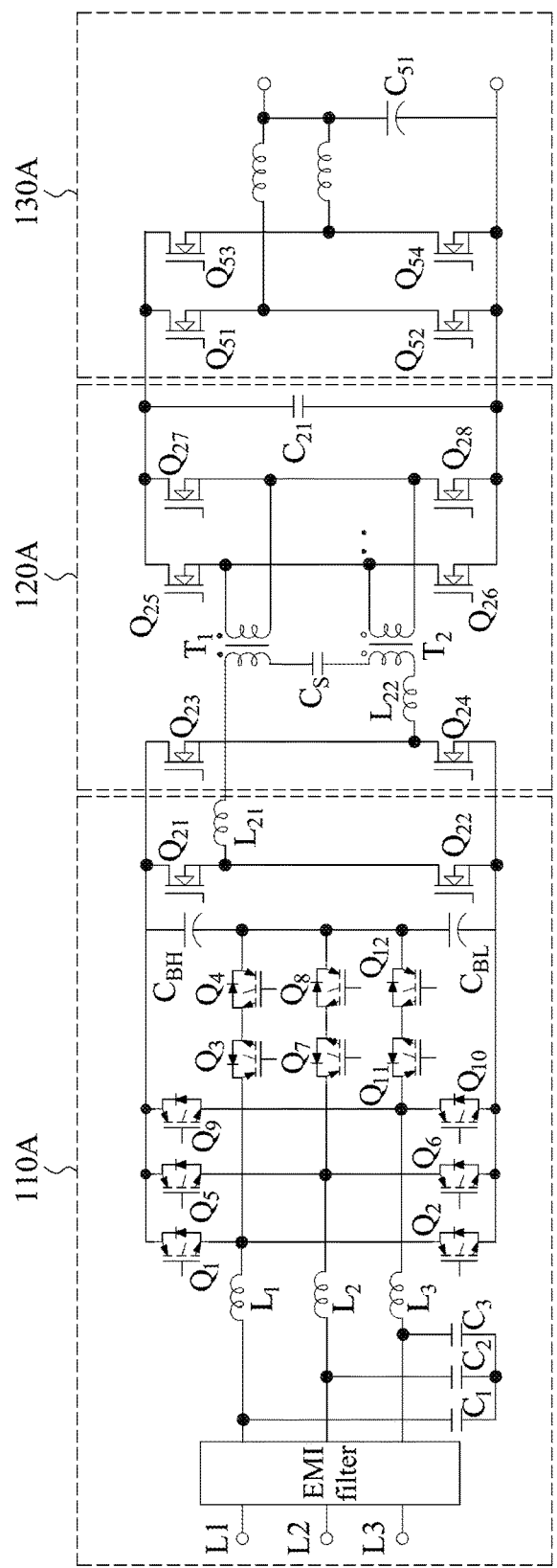
FIG. 8 depicts a schematic diagram of a detailed circuit of the power conversion device in FIG. 5 according to yet another embodiment of this disclosure.

FIG. 8 depicts a schematic diagram of a detailed circuit of the power conversion device 100A in FIG. 5 according to yet another embodiment of this disclosure. As shown in the figure, the AC/DC converter 110A of the power conversion device 100A may be implemented by using a T-type three level inverter/converter. The DC/DC isolation converter 120A may be implemented by using a LLC non-regulating DC/DC isolation converter (DCX). The DC/DC converter 130A may be implemented by using a single or multi-phase buck-boost converter. However, the present disclosure is not limited to the above embodiment, which is merely illustrative of one of the methods for implementing the present disclosure.

Figure 9:
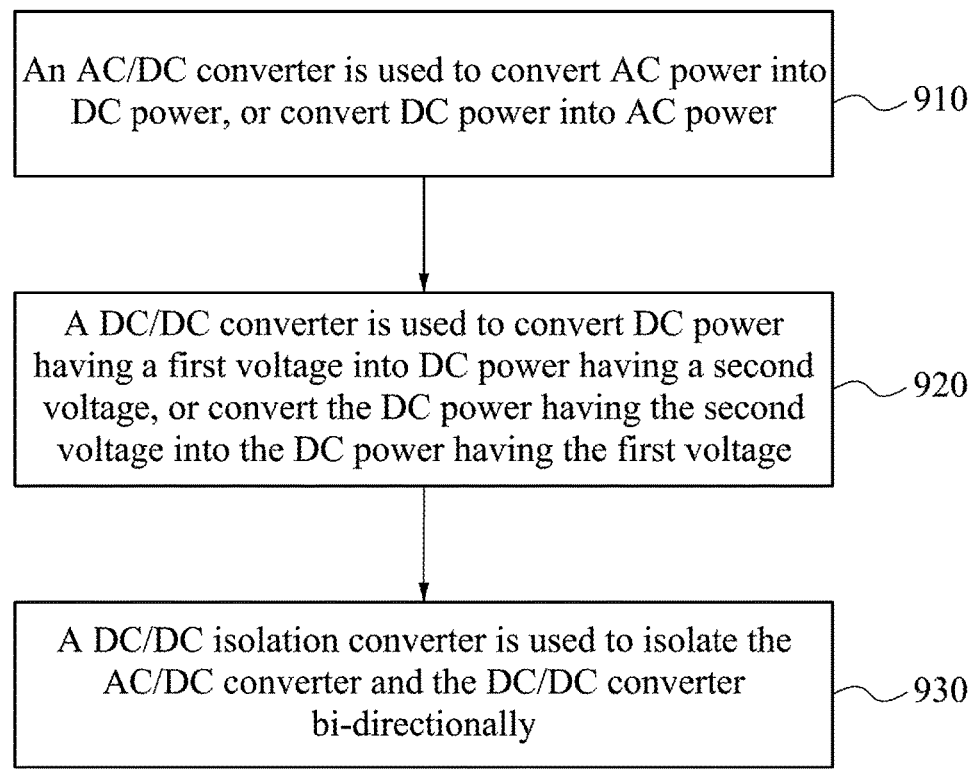
FIG. 9 depicts a schematic flowchart of a power converting method according to one embodiment of this disclosure.

FIG. 9 depicts a schematic flowchart of a power converting method 900 according to one embodiment of this disclosure. As shown in the figure, the power converting method 900 according to the present disclosure comprises the following steps:

Step 910: using an AC/DC converter to convert AC power into DC power, or convert DC power into AC power;

Step 920: using a DC/DC converter to convert DC power having a first voltage into DC power having a second voltage, or convert the DC power having the second voltage into the DC power having the first voltage; and Step 930: using a DC/DC isolation converter to isolate the AC/DC converter and the DC/DC converter bi-directionally.

In order to facilitate the understanding of the power converting method 900 according to the present embodiment, a description is provided with reference to FIG. 1 and FIG. 9. In step 910, the AC power is converted into the DC power or the DC power is converted into the AC power by using the AC/DC converter 110. For example, a D-type three level inverter/converter, a T-type three level inverter/converter, or a two level inverter/converter may be used to convert the AC power into the DC power or convert the DC power into the AC power.

In step 920, the DC power having the first voltage is converted into the DC power having the second voltage or the DC power having the second voltage is converted into the DC power having the first voltage by using the DC/DC converter 130. For example, a multi-phase buck-boost converter may be used to convert the DC power having the first voltage into the DC power having the second voltage or convert the DC power having the second voltage into the DC power having the first voltage.

In step 930, the AC/DC converter 110 and the DC/DC converter 130 are isolated bi-directionally by using the DC/DC isolation converter 120. For example, a high-frequency DC/DC isolation converter may be used to isolate the AC/DC converter 110 and the DC/DC converter 130 bi-directionally. In addition, a LLC non-regulating DC/DC isolation converter (DCX) may be used to isolate the AC/DC converter 110 and the DC/DC converter 130 bi-directionally.

In addition, those skilled in the art will appreciate that each of the steps of the power converting method 900 named after the function thereof is merely used to describe the technology in the embodiment of the present disclosure in detail, but the power converting method 900 is not limited in this regard. Therefore, combining the steps of said method into one step, dividing the steps into several steps, or rearranging the order of the steps is within the scope of the embodiment in the present disclosure.

According to the embodiments of the present disclosure, applying the present disclosure has the following advantages. The embodiments of the present disclosure provide a power conversion device and a power converting method. By using the above device designs and operation method, the power conversion device is allowed to be a bi-directional power conversion device having wide adaptation, and is able to be adapted to a wide range of battery voltage and a wide range of grid voltage and have a high conversion efficiency and safe isolation between an input terminal and an output terminal.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. A power conversion device, comprising:
   an AC/DC converter configured to convert AC power into a first DC power or convert the first DC power into the AC power;
   a DC/DC converter configured to convert the first DC power into a second DC power or convert the second DC power into the first DC power; and
   a DC/DC isolation converter coupled between the AC/DC converter and the DC/DC converter, and configured to isolate the AC/DC converter and the DC/DC converter bi-directionally,
   wherein the DC/DC isolation converter receives the first DC power from the AC/DC converter and transfers the first DC power to the DC/DC converter or receives the second DC power from the DC/DC converter and transfers the second DC power to the AC/DC converter,
   wherein the DC/DC isolation converter does not adjust a voltage of the first DC power and a voltage of the second DC power.

2. The power conversion device of claim 1, wherein the DC/DC isolation converter comprises a high-frequency DC/DC isolation converter.

3. The power conversion device of claim 1, wherein the DC/DC isolation converter comprises a LLC non-regulating DC/DC isolation converter.

4. The power conversion device of claim 1, wherein the AC/DC converter is a D-type three level inverter/converter, a T-type three level inverter/converter or a two level inverter/converter.

5. The power conversion device of claim 1, wherein the DC/DC converter comprises a multi-phase buck-boost converter.

6. A power converting method applied to a power conversion device, wherein the power conversion device comprises an AC/DC converter, a DC/DC isolation converter, and a DC/DC converter, the DC/DC isolation converter is coupled between the AC/DC converter and the DC/DC converter, wherein the power converting method comprises:
   using the AC/DC converter to convert AC power into a first DC power, or convert the first DC power into the AC power;
   using the DC/DC converter to convert the first DC power into a second DC power, or convert the second DC power into the first DC power; and
   using the DC/DC isolation converter to isolate the AC/DC converter and the DC/DC converter bi-directionally,
   wherein the DC/DC isolation converter receives the first DC power from the AC/DC converter and transfers the first DC power to the DC/DC converter or receives the second DC power from the DC/DC converter and transfers the second DC power to the AC/DC converter,
   wherein the DC/DC isolation converter does not adjust a voltage of the first DC power and a voltage of the second DC power.

7. The power converting method of claim 6, wherein using the DC/DC isolation converter to isolate the AC/DC converter and the DC/DC converter bi-directionally comprises:
   using a high-frequency DC/DC isolation converter to isolate the AC/DC converter and the DC/DC converter bi-directionally.

8. The power converting method of claim 6, wherein using the DC/DC isolation converter to isolate the AC/DC converter and the DC/DC converter bi-directionally comprises:
   using a LLC non-regulating DC/DC isolation converter (DCX) to isolate the AC/DC converter and the DC/DC converter bi-directionally.

9. The power converting method of claim 6, wherein using the AC/DC converter to convert the AC power into the first DC power, or convert the first DC power into the AC power comprises:

using a D-type three level inverter/converter, a T-type three level inverter/converter or a two level inverter/converter to convert the AC power into the first DC power, or convert the first DC power into the AC power.

10. The power converting method of claim 6, wherein using the DC/DC converter to convert the first DC power into the second DC power, or convert the second DC power into the first DC power comprises:

using a multi-phase buck-boost converter to convert the first DC power into the second DC power, or convert the second DC power into the first DC power.

\* \* \* \* \*